United States Patent
Bunker (10) Patent No.: US 7,090,942 B2
(45) Date of Patent: Aug. 15, 2006

(54) FLOW DISRUPTOR ENHANCED FUEL CELL

(75) Inventor: Ronald Scott Bunker, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 587 days.

(21) Appl. No.: 10/246,066

(22) Filed: Sep. 18, 2002

(65) Prior Publication Data

US 2004/0053094 A1 Mar. 18, 2004

(51) Int. Cl.
*H01M 8/04* (2006.01)
(52) U.S. Cl. .......................... 429/34; 429/36
(58) Field of Classification Search .................. 429/12, 429/13, 30, 34, 36, 26, 38
See application file for complete search history.

(56) References Cited

U.S. PATENT DOCUMENTS

| | | | | |
|---|---|---|---|---|
| 4,977,041 A | * | 12/1990 | Shiozawa et al. | 429/26 |
| 5,993,985 A | * | 11/1999 | Borglum | 429/31 |
| 2004/0197633 A1 | * | 10/2004 | Yamamoto et al. | 429/34 |

FOREIGN PATENT DOCUMENTS

WO WO 01/41239 6/2001

OTHER PUBLICATIONS

Patent Application 120376, U.S. Appl. No. 10/212,541, filed Aug. 6, 2002.

* cited by examiner

*Primary Examiner*—Michael Barr
*Assistant Examiner*—Monique Wills
(74) *Attorney, Agent, or Firm*—Patrick K. Patnode; Donald S. Ingraham (57) ABSTRACT

The present invention provides a fuel cell assembly comprising at least one fuel cell. The fuel cell comprises an anode, a cathode, and a electrolyte interposed therebetween; at least one fluid flow channel disposed within the fuel cell for delivering a fluid to the fuel cell and at least one array of flow disruptors in contact with at least one of the anode, the cathode and the electrolyte. The flow disruptors protrude into the fluid flow channel so as to disrupt a fluid flow and enhance a heat transfer rate between the fluid and the fuel cell assembly when the fluid is introduced into the fluid flow channel.

22 Claims, 10 Drawing Sheets

FLOW DISRUPTOR ENHANCED FUEL CELL

BACKGROUND OF INVENTION

The present invention relates generally to power generation equipment such as fuel cells, and particularly to thermal management of fuel cells, for example, solid oxide fuel cells.

A fuel cell is an energy conversion device that produces electricity by electrochemically combining a fuel and an oxidant across an ionic conducting layer. A high temperature fuel cell bundle, for example, a solid oxide fuel cell bundle is typically constructed from flat single members having a planar configuration. The planar fuel cells can be of counter-flow, cross-flow and parallel flow varieties. The planar fuel cell typically comprises tri-layer anode/electrolyte/cathode components that conduct current from cell to cell and provide channels for gas flow into a cubic structure or stack.

Fuel cells, such as solid oxide fuel cells, have demonstrated potential for high efficiency and low pollution in power generation. However, problems associated with thermal management persist, particularly in regulating the temperature gradient of the fuel cell components. Thermal energy generated in the fuel cell from the reaction of the fuel and the oxidant needs to be removed or used internally in order to maintain the operating temperature in the fuel cell. Cooling channels in the fuel cells typically use an oxidant, such as air, to aid in the transfer or removal of waste heat from the fuel cell to the oxidant, so as to maintain a stack temperature at or below prescribed limits and maintain a predetermined thermal gradient. A temperature difference between a fuel cell assembly and a fluid, such as the oxidant, is a function of heat transfer characteristics of the fluid flowing through the fluid flow channel and a heat flux generated in the fuel cell assembly. However, such fluid flow channels, as used in conventional fuel cell applications, have a low convective thermal transfer coefficient between the fluid flow channel and the fluid flowing therethrough. Accordingly, there is a need in the art for a fuel cell having improved fluid passages that provide improved heat transfer characteristics.

BRIEF DESCRIPTION OF INVENTION

One embodiment of the present invention provides a fuel cell assembly comprising at least one fuel cell. The fuel cell comprises an anode, a cathode, and a electrolyte interposed therebetween; at least one fluid flow channel disposed within the fuel cell for delivering a fluid to the fuel cell and at least one array of flow disruptors in contact with at least one of the anode, the cathode and the electrolyte. The flow disruptors protrude into the fluid flow channel so as to disrupt a fluid flow and enhance a heat transfer rate between the fluid and the fuel cell assembly when the fluid is introduced into the fluid flow channel.

BRIEF DESCRIPTION OF DRAWINGS

These and other features, aspects, and advantages of the present invention will become better understood with reference to the following description, appended claims, and accompanying drawings.

DETAILED DESCRIPTION

The present invention provides a fuel cell assembly 10, for example a solid oxide fuel cell (hereinafter "SOFC") assembly, which typically comprises an array, bundle or stack of fuel cells comprising at least one fuel cell 50 (see FIG. 1). Each fuel cell 50 is a repeat fuel cell unit 50 capable of being stacked together either in series or in parallel or both to build a fuel cell stack system or architecture that is capable of producing an electrical energy output.

The fuel cell 50 can be any type of fuel cells, which require flow channels, such as solid oxide fuel cells, proton exchange membrane fuel cells, molten carbonate fuel cells, phosphoric acid fuel cells, alkaline fuel cells, direct methanol fuel cells, regenerative fuel cells, zinc air fuel cells, and protonic ceramic fuel cells.

Figure 1:
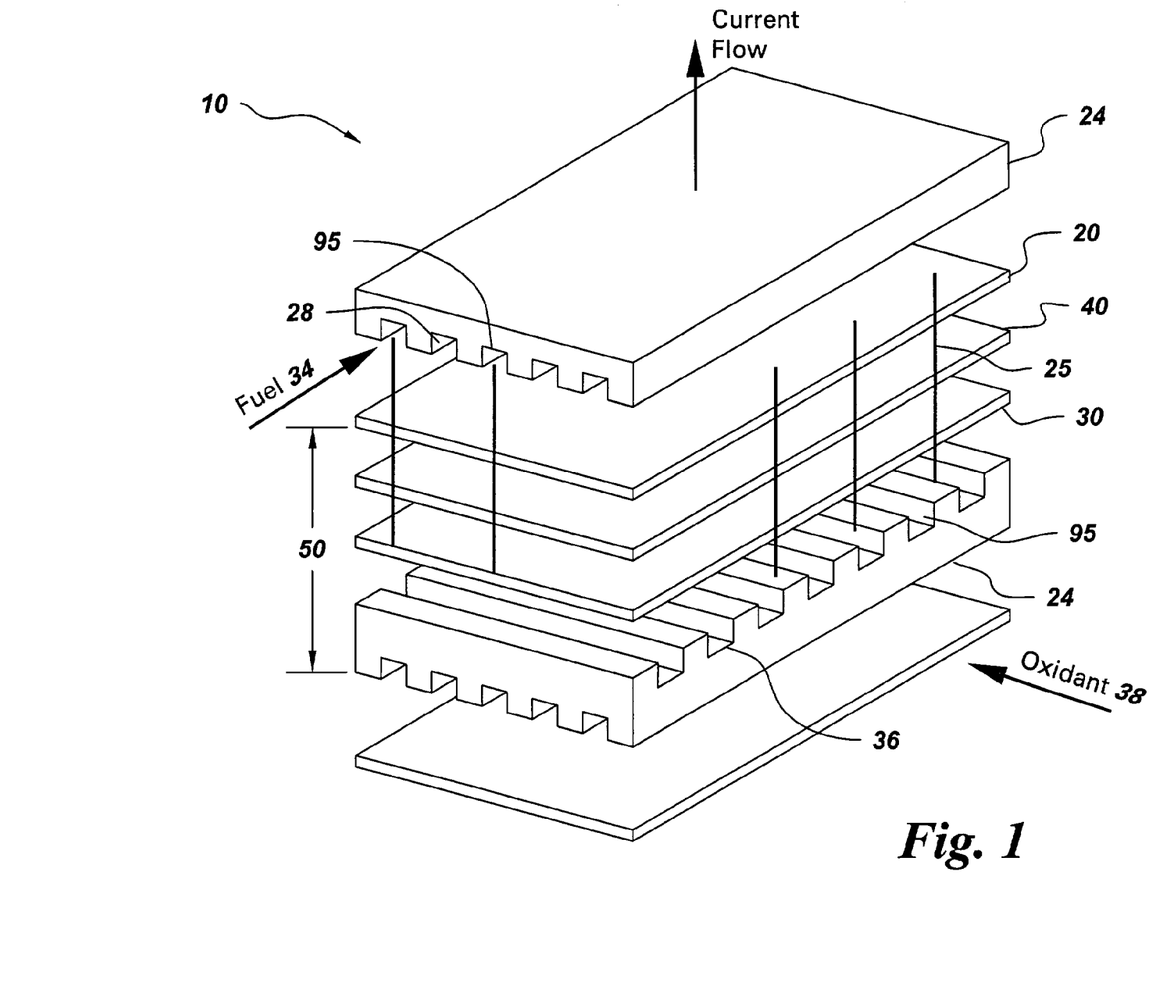
FIG. 1 is an exemplary exploded isometric view of a single unit of a planar fuel cell in accordance with one embodiment of the present invention.

The exemplary fuel cell 50, for example, the solid oxide fuel cell is illustrated in FIG. 1. An oxidant 38, for example air, is fed to a cathode 30. Oxygen ions ($O^{2-}$) generated at the cathode 30 are transported across an electrolyte 40 interposed between an anode 20 and the cathode 30. A fuel 34, for example natural gas, is fed to the anode 20. The fuel 34 at the anode 20 reacts with oxygen ions ($O^{2-}$) being migrated to the anode 20 across the electrolyte 40. The oxygen ions ($O^{2-}$) are de-ionized to release electrons to an external electric circuit (not shown). The electron flow thus produces direct current electricity across the external electric circuit (not shown). As a result, the electricity generation process produces certain exhaust gases and generates waste heat.

The anode 20 typically provides reaction sites for the electrochemical oxidation of a gas fuel introduced into the fuel cell 50. Accordingly, it is desirable that the anode 20 be passive against a fuel-reducing environment and have adequate electronic conductivity. In addition, it is desirable that the anode 20 promotes catalytic activity for fuel gas reaction at the fuel cell 50 operating conditions and has sufficient porosity to allow gas transport to the reaction sites. The materials suitable for the anode 20 having aforesaid properties, include, but are not limited to, metallic nickel, nickel alloy, silver, copper, cobalt, ruthenium, nickel-yttria-stabilized zirconia cermets (Ni—YSZ cermets), copper-yttria-stabilized zirconia cermets (Cu—YSZ cermets), Ni-Ceria cermets, Ceramics or combinations thereof.

The cathode 30 typically provides reaction sites for the electrochemical reduction of the oxidant. Accordingly, it is desirable that the cathode 30 be passive against an oxidizing environment and has sufficient electronic conductivity. In addition, it is desirable that the cathode 30 promotes catalytic activity for the oxidant gas reaction at the fuel cell 50 operating conditions and has sufficient porosity to allow gas transport to the reaction sites. The materials suitable for the cathode 30 having aforesaid properties, include, but are not limited to, perovskite doped lanthanum manganate ($LaMnO_3$), strontium-doped $LaMnO_4$ (SLM), tin doped Indium Oxide ($In_2O_3$), strontium-doped $PrMnO_3$, $LaFeO_3$—$LaCoO_3$ $RuO_2$-Yttria-stabilized zirconia (YSZ), lanthanum cobaltite, and combinations thereof.

The anode 20 and the cathode 30 typically have a surface area sufficient to support electrochemical reactions. The materials used for the anode 20 and the cathode 30 are thermally stable between the typical minimum and maximum operating temperature of the fuel cell assembly 10, for example between about 600° C. to about 1300° C.

The electrolyte 40 is typically disposed between the anode 20 and the cathode 30 as shown in exemplary exploded isometric view of the fuel cell 50 in FIG. 1. The electrolyte 40 serves to transport ions, such as oxygen ions ($O^{2-}$), between the cathode 30 and the anode 20. In addition, the electrolyte 40 separates the fuel 34 from the oxidant 38 in the fuel cell 50. Accordingly, it is desirable that the electrolyte 40 be passive against both the fuel reducing and the oxidizing environments and impermeable to the reacting gases. In addition, it is desirable that the electrolyte 40 be sufficiently conductive at the operating conditions of the fuel cell 50. The materials suitable for the electrolyte 40 having aforesaid properties, include, but are not limited to, zirconium oxide, yttria stabilized zirconia (YSZ), doped ceria, cerium oxide ($CeO_2$), bismuth sesquioxide, pyrochlore oxides, doped zirconates, perovskite oxide materials and combinations thereof.

An interconnect 24 typically electrically connects the anode 20 of one repeatable fuel cell 50 unit to the cathode 30 of an adjacent fuel cell 50 unit (see FIG. 1). In addition, the interconnect 24 should provide uniform current distribution and be impermeable to fuel and oxidant gases. It is desirable that the interconnect 24 be passive against both the fuel reducing and the oxidizing environments and be sufficiently conductive to support electron flow at a variety of temperatures of the fuel cell 50. The materials suitable for the interconnect 24 having aforesaid properties, include, but are not limited to, chromium based ferritic stainless steel, cobaltite, ceramic, lanthanum chromate ($LaCrO_3$), cobalt dichromate ($CoCr_2O_4$), Inconel 600, Inconel 601, Hastelloy X, Hastelloy-230, Ducrolloy, Kovar, Ebrite and combinations thereof.

Figure 2:
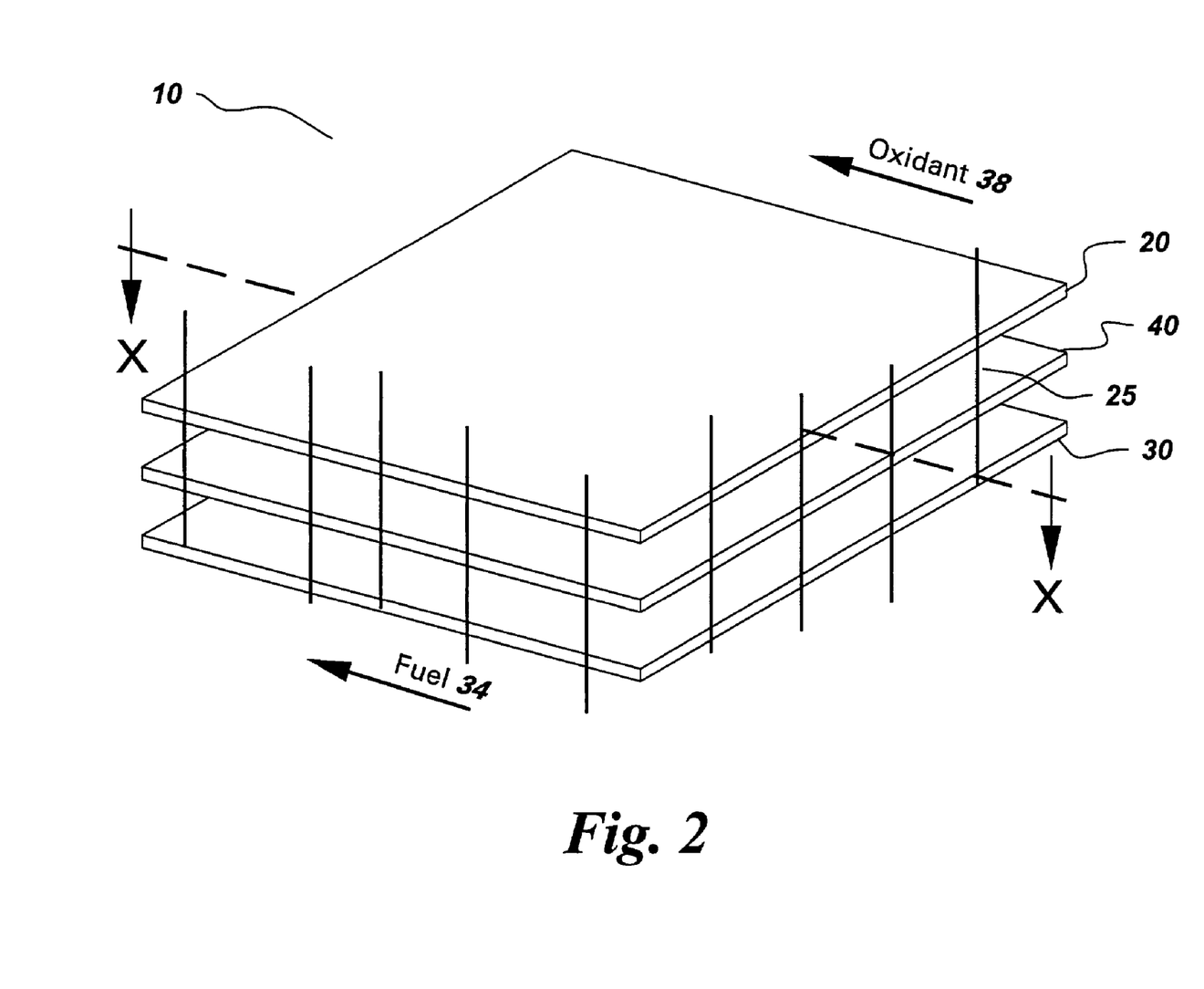
FIG. 2 is an exemplary isometric view of the fuel cell components of FIG. 1 illustrating a plurality of flow disruptors disposed thereon.

Referring to FIG. 1, the fuel cell 50, such as the solid oxide fuel cell 50 comprises the anode 20, the cathode 30 and the electrolyte 40 interposed therebetween. At least one fluid flow channel 95 is disposed within the fuel cell 50. Referring to FIG. I and FIG. 2, at least one array of flow disruptors 25 is coupled to least one of the anode 20, the cathode 30 and the electrolyte 40. In one embodiment of the present invention as illustrated in FIG. 3, the flow disruptors 250, 255 extend from the electrolyte 40 through a surface of at least one of the anode 20 and the cathode 30.

Figure 4:
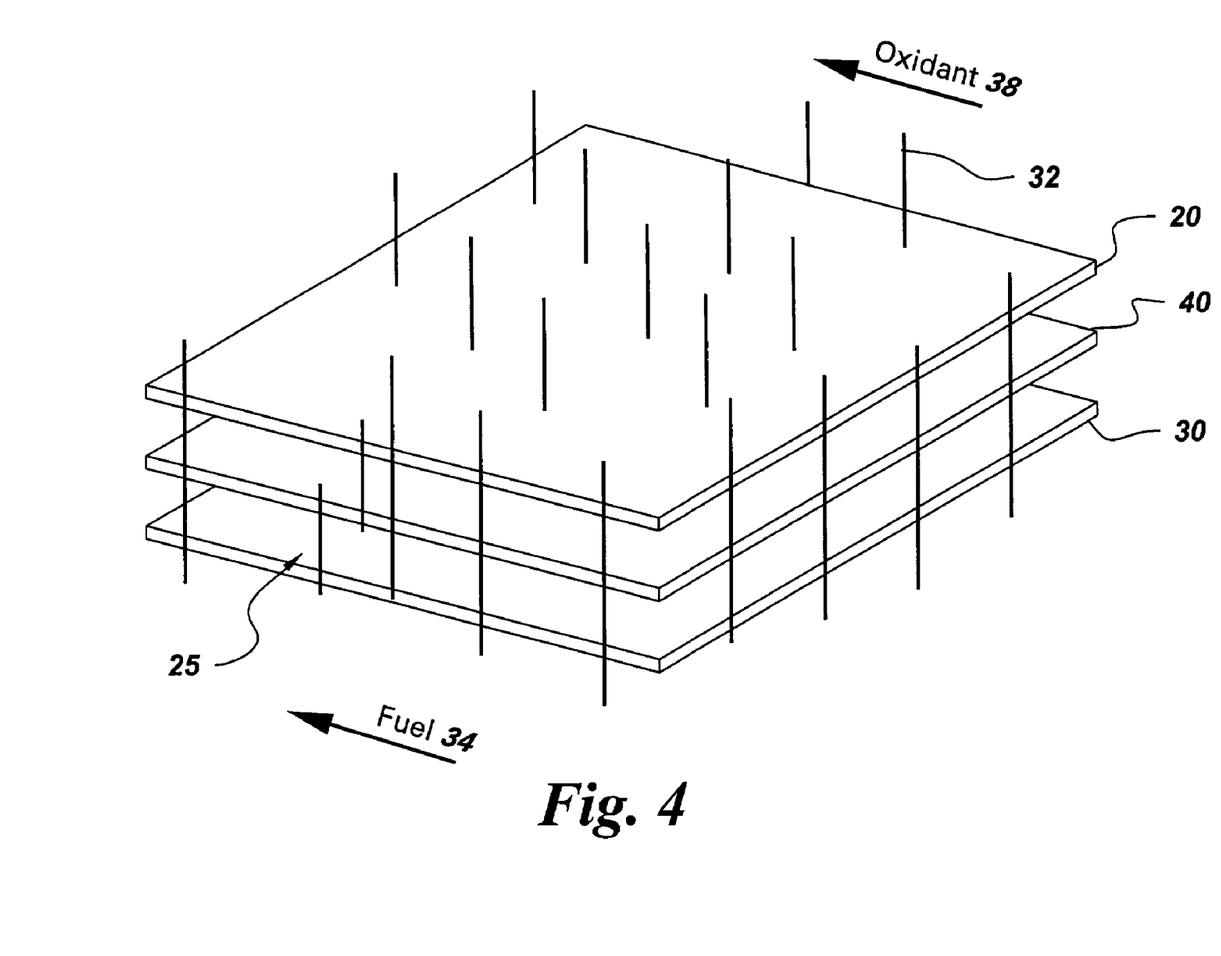
FIG. 4 is an exemplary arrangement of flow disruptors in a single fuel cell in accordance with one embodiment of the present invention.
Figure 5:
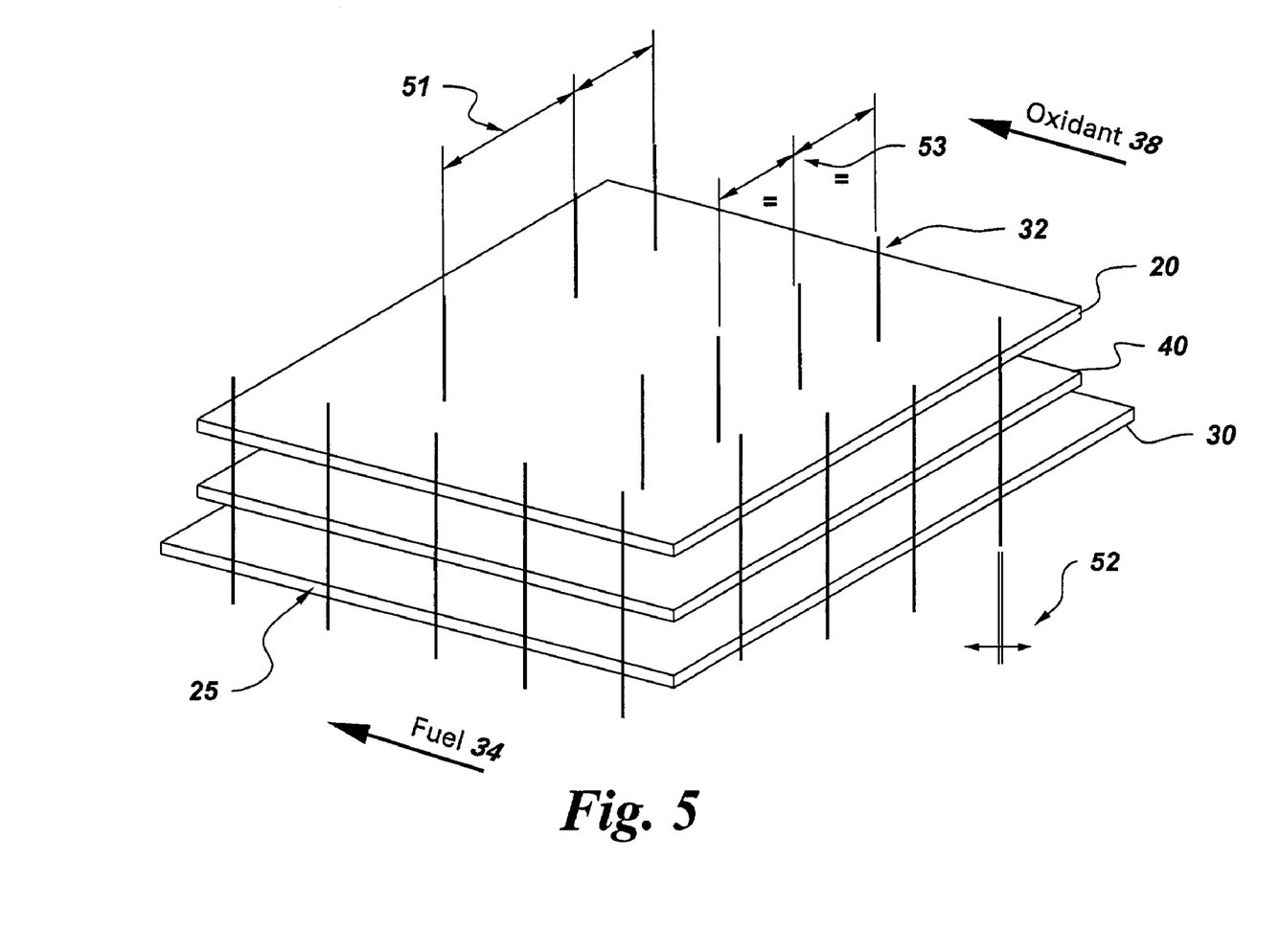
FIG. 5 is an exemplary arrangement of flow disruptors in a single fuel cell in accordance with one embodiment of the present invention.
Figure 6:
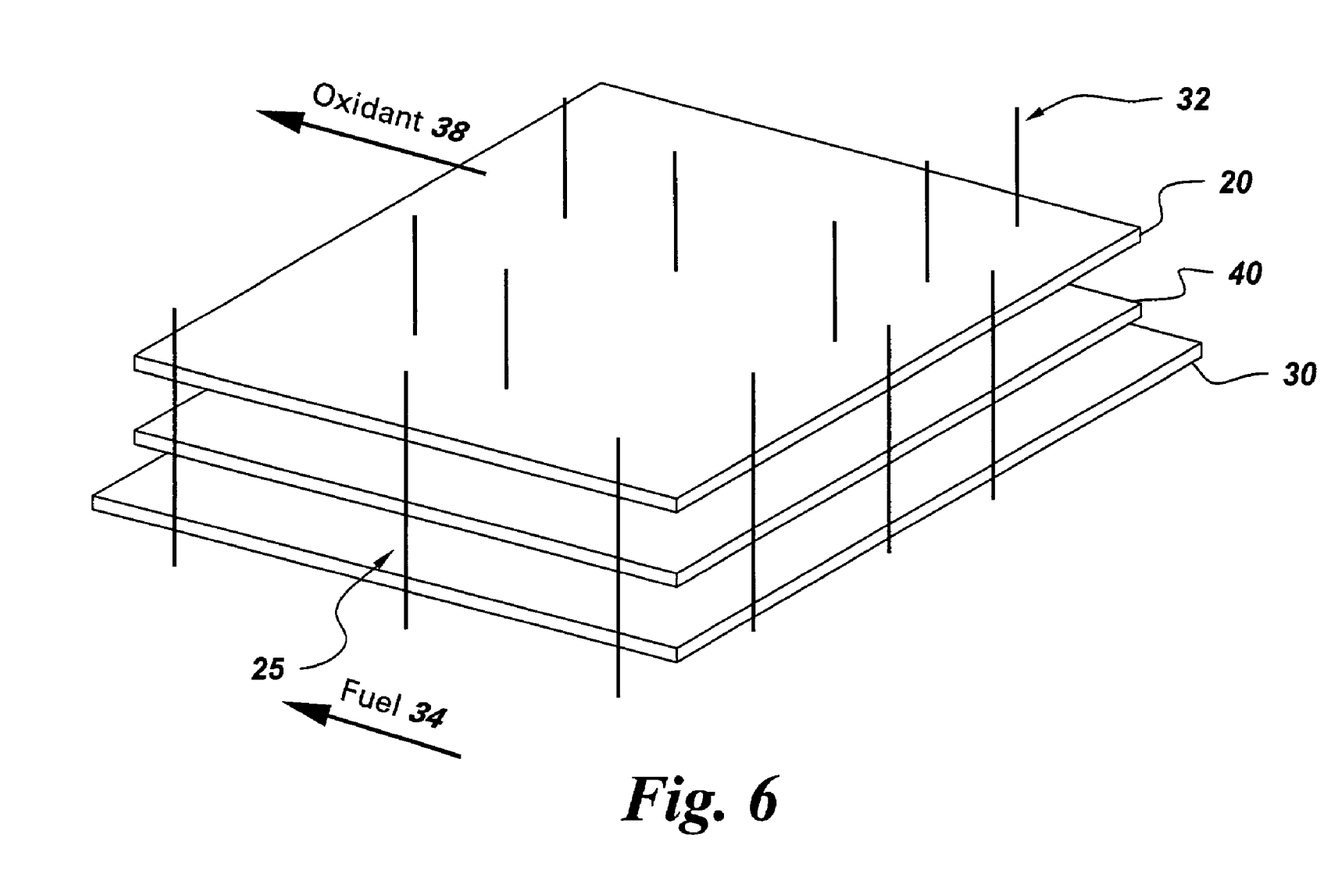
FIG. 6 is an exemplary arrangement of flow disruptors in a single fuel cell in accordance with one embodiment of the present invention.
Figure 8:
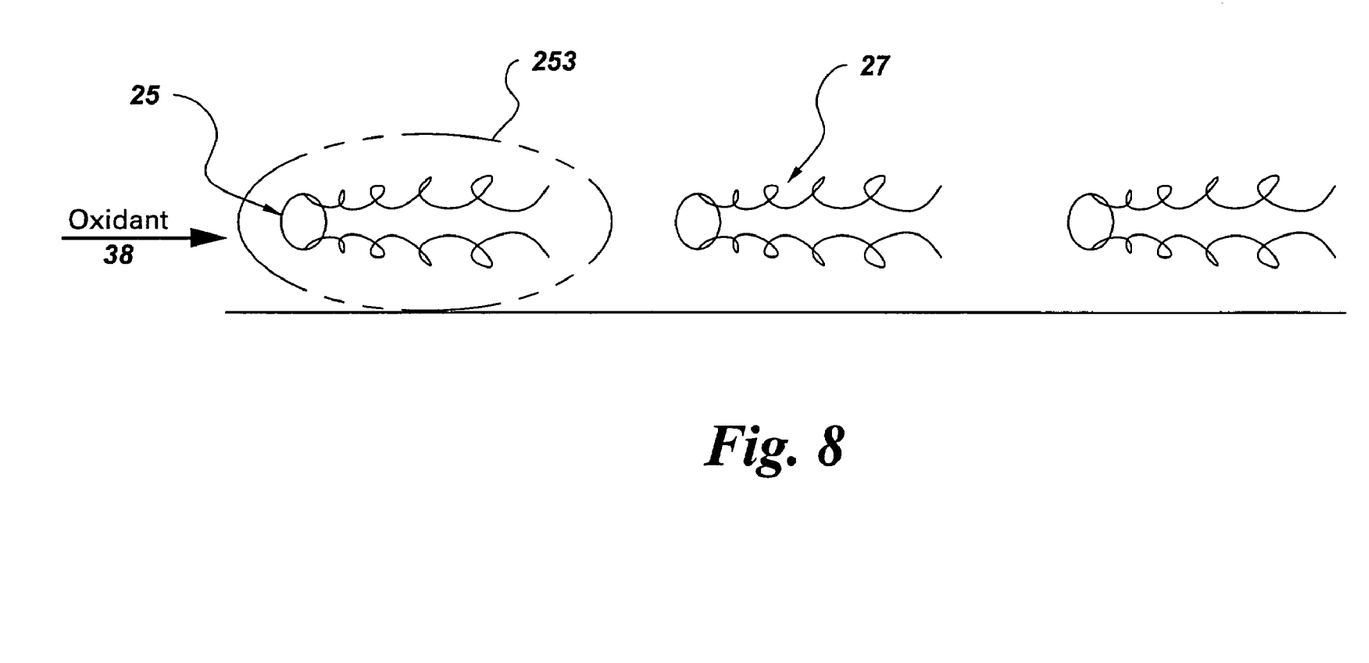
FIG. 8 is an exemplary schematic view of a flow characteristic of the flow disruptors.

The fluid flow channel 95 typically comprises at least one oxidant flow channel 28 and at least one fuel flow channel 36 disposed within the fuel cell 50 (see FIG. 1). In accordance with another embodiment, as shown in FIGS. 4–6, the array of flow disruptors 25 further include a second array of flow disruptors 32. The flow disruptors 25,32 extend from the electrolyte 40 into at least one of the cathode 30 and the anode 20. The flow disruptors 25,32 typically comprise, but are not limited to, discrete pins, trip strips and baffle turbulators. As illustrated in FIG. 1, these flow disruptors 25,32 protrude into at least one of the oxidant flow channel 28 and the fuel flow channel 36 to disrupt a fluid flow, for example, the oxidant flow 38, the fuel flow 34 or both. The oxidant flow 38 inside the oxidant flow channel 28 as well as the fuel flow 34 inside the fuel flow channel 36 in fuel cell 50 illustrated in FIG. 1, is typically either laminar or transitional having Reynolds number characteristics lower than critical Reynolds number. As illustrated in an exemplary schematic view in FIG. 8, the flow disruptors 25 typically create an unsteady wake 27 behind each flow disruptor 25. The unsteady wake 27 is created due to separation of a boundary layer between the fluid flow, such as oxidant flow 38, and the flow disrupter 25. As used herein, the term "unsteady wake" refers to a turbulence created in the fluid flow path across the fluid flow channel 95 such as the oxidant flow channel 28 in FIG. 1. Creating turbulence in the fluid flow path across the fluid flow channel 95, for example the oxidant flow channel 28, enhances the Nusselt number of a fluid flow for example an oxidant flow 38 across the fluid flow channel 95 such as oxidant flow channel 28. Enhancing the Nusselt number of the fluid flow across the fluid flow channel 95 improves the convective heat transfer characteristics significantly beyond the baseline laminar convective heat transfer characteristics between the fluid and the fuel cell 50. Enhanced heat transfer characteristics increase the ability to remove heat from the fuel cell 50 more efficiently and more effectively. A temperature difference between a fuel cell 50 and a fluid, such as the oxidant 38, is a function of heat transfer characteristics of the fluid flowing through the fluid flow channel 95 and a heat flux generated in the fuel cell 50 in FIG. 1. Such enhanced heat transfer characteristics addresses improved cooling requirements of the fuel cell assembly 10 comprising a plurality of fuel cell 50. Enhancing heat transfer characteristics of the fuel cell 50 also ensures maintaining a predetermined uniform thermal gradient and temperature level globally across the entire fuel cell 50. Maintaining the predetermined uniform thermal gradient across the fuel cell 50 aids in avoiding generation of potential thermal hot spots in different locations of the fuel cell assembly 10. In the fuel cell assembly 10 in FIG. 1, thermal hot spots degenerate thermal performance and life of the fuel cell assembly 10 substantially. Accordingly, heat transfer characteristics of the fuel cell assembly 10 significantly improve thermal performance and life of the fuel cell assembly 10 compared to a fuel cell assembly with baseline laminar convective heat transfer characteristics. Additionally, the fuel cell assembly with baseline laminar convective heat transfer characteristics typically does not address additional cooling requirement of the fuel cell assembly 10, unless fluid flow, such as the oxidant flow 38 through the oxidant flow channel 28 in FIG. 1 is substantially increased. The flow disruptors 25,32 enhance thermal performance and life of the fuel cell assembly 10 without increasing the fluid flow, such as oxidant flow 38, flowing through the oxidant flow channel 28.

Figure 3:
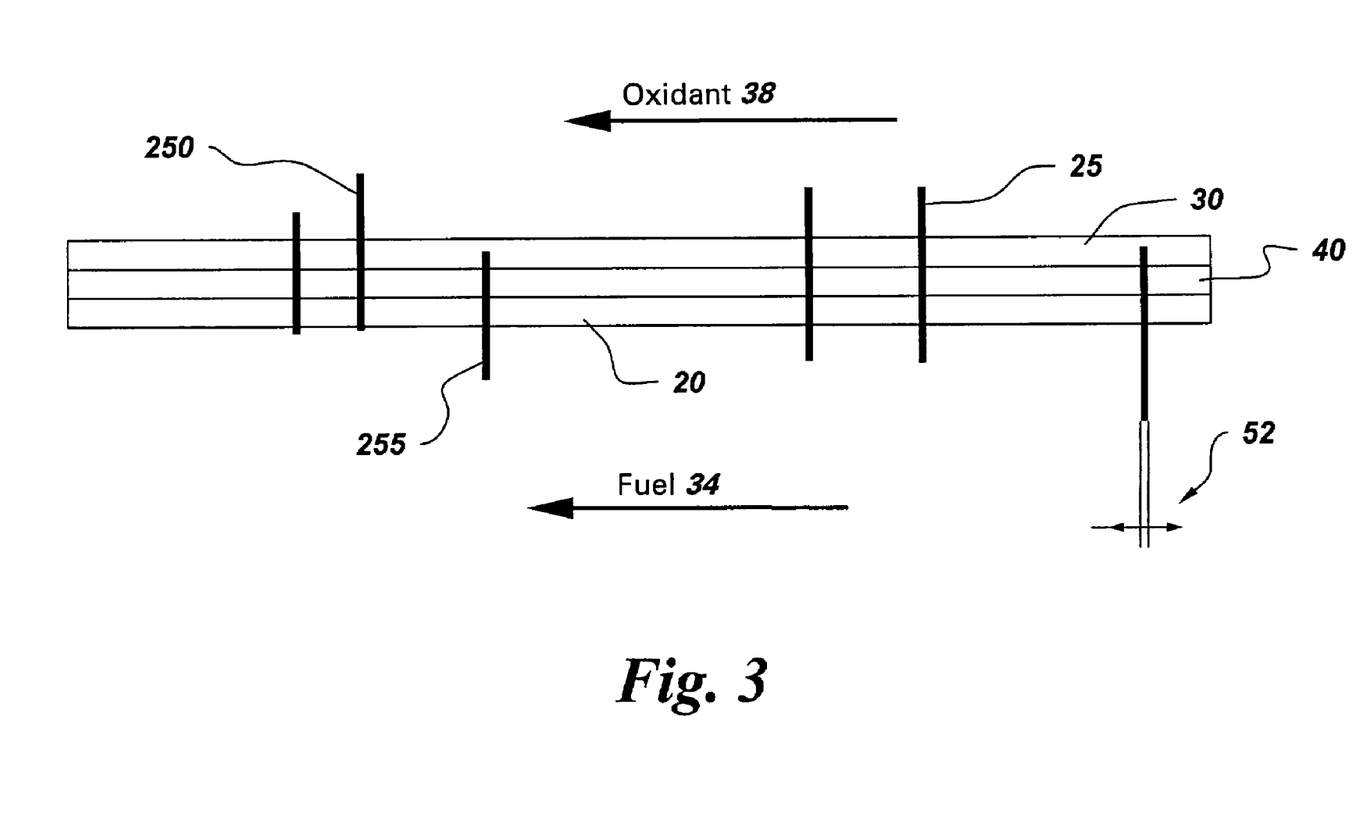
FIG. 3 is a sectional view of FIG. 2 across section X—X.

In accordance with another embodiment of the present invention the array of flow disruptors 25,32 has a width 52 in the range between about 0.020 inches to about 0.25 inches (see FIG. 3 and FIG. 5). In a further embodiment, the flow disruptors 25,32 have a substantially constant cross-sectional area that typically ensure uniform heat transfer characteristics throughout the array of flow disruptors 25,32. In accordance with the aforesaid embodiment, the flow disruptors 25,32 have a cross-sectional shape typically comprising, but not limited to, square, rectangular, circular, elliptical, annular and irregular shapes. It will be appreciated that the choice of flow disrupter 25,32 width 52, cross sectional shape and cross sectional area are left to the artisan so as to provide improved structural stability and strength to the fuel cell 50 layers in FIG. 1. Additionally, the flow disruptors 25,32 typically provide increased surface area at an interface of at least one of the anode 20, electrolyte 40 and cathode 30 so as to enhance electrochemical reaction rate across layers of the anode 20, the cathode 30 and the electrolyte 40.

Figure 9:
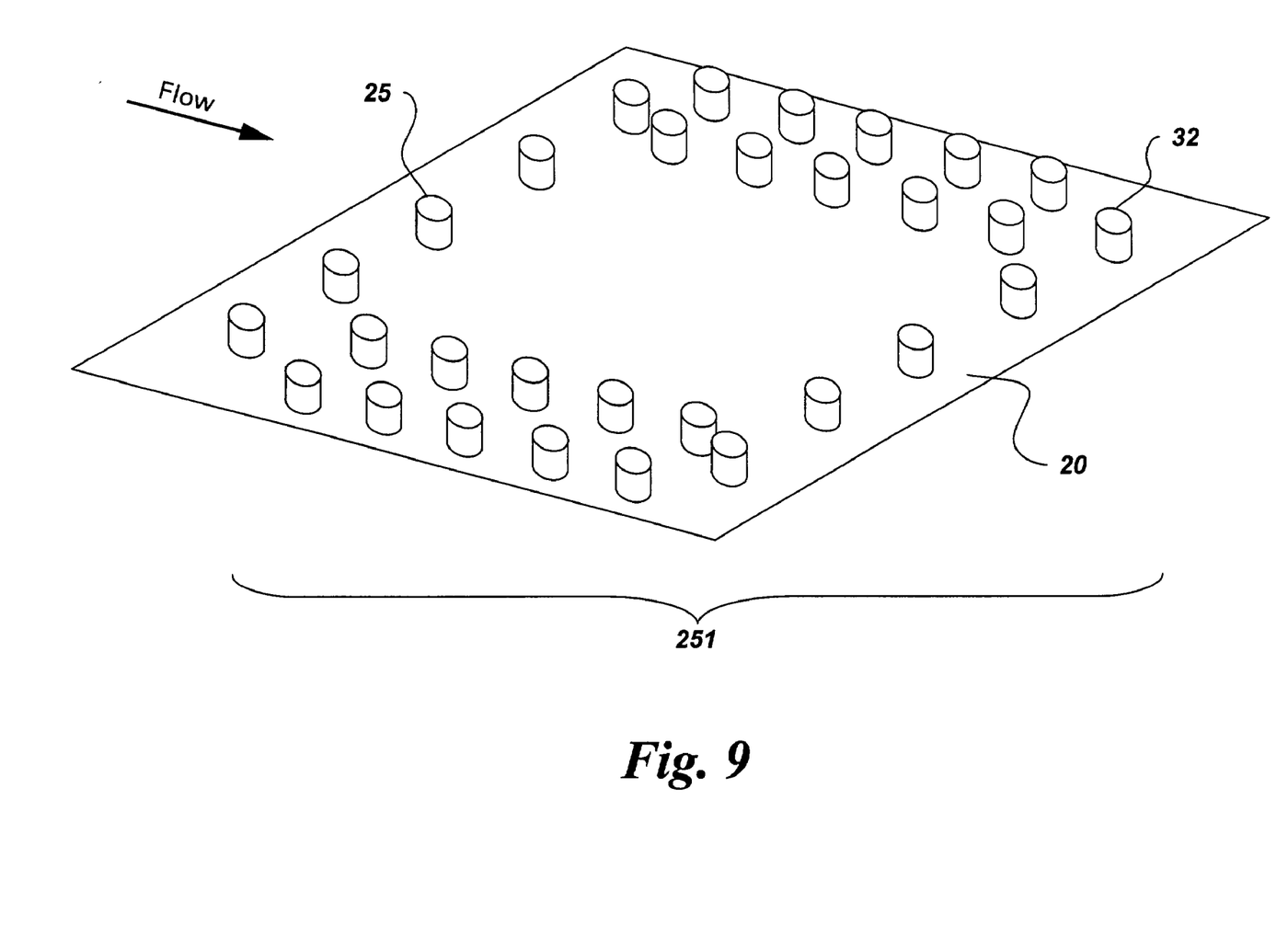
FIG. 9 is an exemplary pattern of array of flow disruptors in a single fuel cell in accordance with one embodiment of the present invention.
Figure 10:
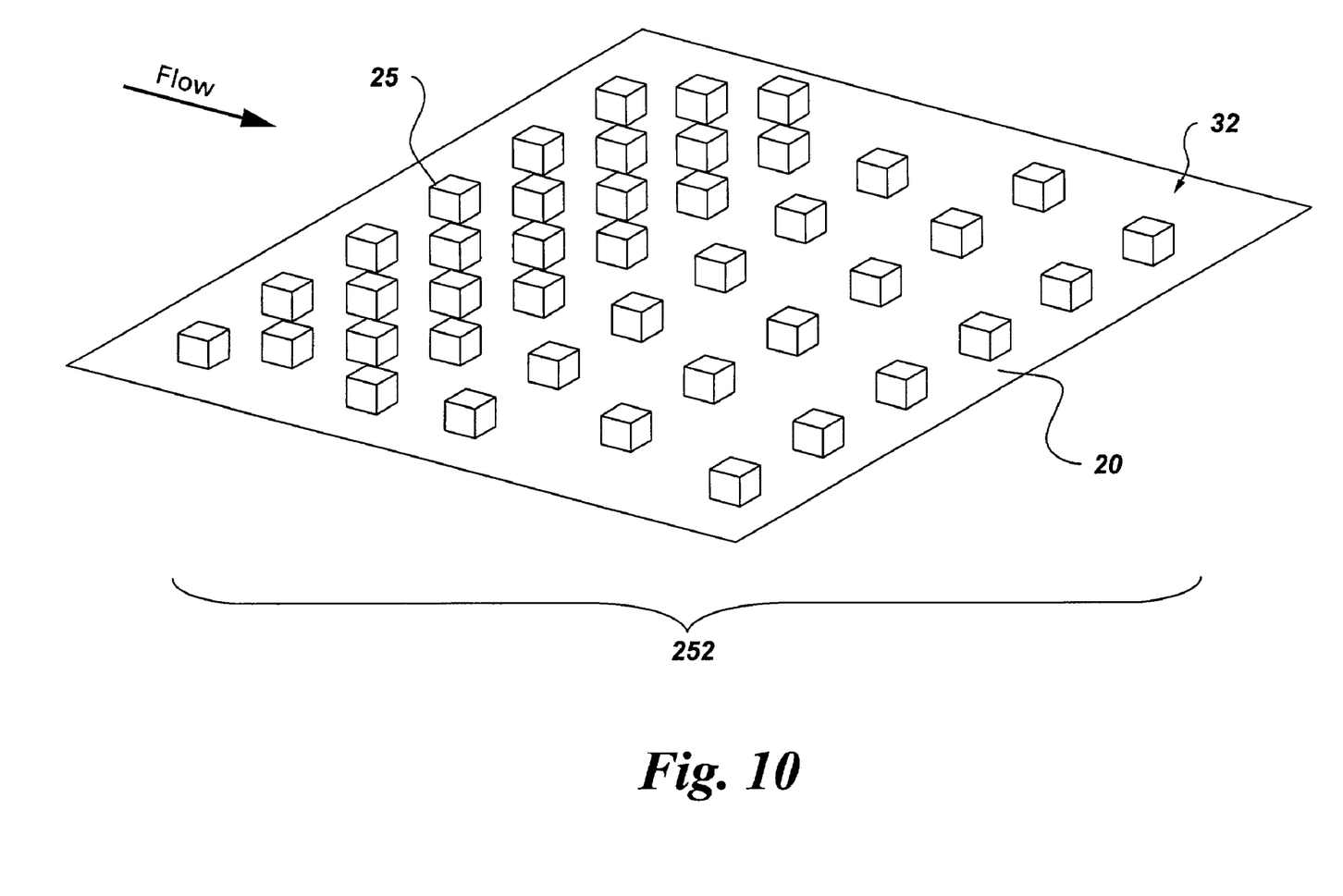
FIG. 10 is an exemplary pattern of array of flow disruptors in a single fuel cell in accordance with another embodiment of the present invention.

In another embodiment of the present invention, as shown in FIGS. 4,6, the array of flow disruptors 25,32 typically comprise in-line, staggered, uniformly spaced, and irregularly spaced arrangements. FIG. 4 represents an exemplary in-line arrangement of the array of flow disruptors 25,32. In an exemplary embodiment, as illustrated in FIG. 5, a distance 51 between subsequent flow disruptors 25,32 is irregular. In another embodiment, a distance 53 between subsequent flow disruptors 25,32 is uniform. In another embodiment of the present invention, FIG. 6 shows a staggered arrangement of the array of flow disruptors 25,32. It will be appreciated that an arrangement and spacing of the flow disruptors 25,32 may vary depending upon a desired application. One exemplary embodiment in FIG. 9 shows an arrangement of flow disruptors 25,32 with a patterned array 251, distributed evenly around the periphery of a surface of at least one of the anode 20, the cathode 30 and the electrolyte 40. Another exemplary embodiment in FIG. 10 shows an arrangement of flow disruptors 25,32 with a patterned array 252 stretched unevenly throughout the surface of at least one of the anode 20, the cathode 30 and the electrolyte 40. Arrangement and spacing of flow disruptors 25,32 also control a typical region of interaction or re-circulation 253 for the unsteady wakes 27 in FIG. 8. As illustrated in an exemplary schematic view of a flow characteristic of the flow disruptors in FIG. 8, these unsteady wakes are generated due to a boundary layer separation of the fluid from each flow disrupter 25 when each flow disruptor 25 is exposed to a stream of either oxidant flow 38 or fuel flow 34. Controlling the typical region of interaction or re-circulation 253 for the unsteady wakes 27 tailors flow distribution profile and maintains thermal-hydrodynamic stability in desired locations across the fluid flow path of the fluid flow channel 95 of the fuel cell 50 in FIG. 1. Accordingly, arrangement, spacing and cross sectional shape of flow disruptors 25,32 are typically chosen by an artisan skilled in the art in such a fashion as to tailor thermal gradient across the exemplary fuel cell assembly 10 illustrated in FIG. 1, at desired locations. Tailored thermal gradient in desired locations across the fuel cell assembly 10 ensures maintaining desired thermal potential across the fuel cell assembly 10.

It is desirable that the flow disruptors 25,32 be passive against both the fuel reducing and the oxidizing environments and be impermeable to the fuel and oxidant gases. In addition, it is desirable that the flow disruptors withstand heat flux across the fuel cell 50. In one embodiment, the flow disruptors 25,32 comprise a ceramic material. In another embodiment, the flow disruptors comprise a material as one of the anode 20, the cathode 30 and the electrolyte 40. The materials suitable for the flow disruptors 25,32 having the aforesaid properties include, but are not limited to, metallic nickel, silver, copper, cobalt, ruthenium, nickel-yttria-stabilized zirconia cermets (Ni—YSZ cermets), copper-yttria-stabilized zirconia cermets (Cu—YSZ cermets), Ni-Ceria cermets, perovskite doped lanthanum manganate ($LaMnO_3$), strontium-doped $LaMnO_4$ (SLM), tin doped Indium Oxide ($In_2O_3$), strontium-doped $PrMnO_3$, $LaFeO_3$—$LaCoO_3$ $RuO_2$-Yttria-stabilized zirconia (YSZ), lanthanum cobaltite, zirconium oxide, yttria stabilized zirconia (YSZ), doped ceria, cerium oxide ($CeO_2$), bismuth sesquioxide, pyrochlore oxides, doped zirconates, perovskite oxide materials, perfluorinated sulfonic acid polymers, polymer composites and combinations thereof. However, flow disruptors 25,32 protruding into the fluid flow channel 95 should desirably avoid electro-mechanical contact with the interconnect 24 to prevent any possible electrical short circuit across the fuel cell 50. (See FIG. 1)

Figure 7:
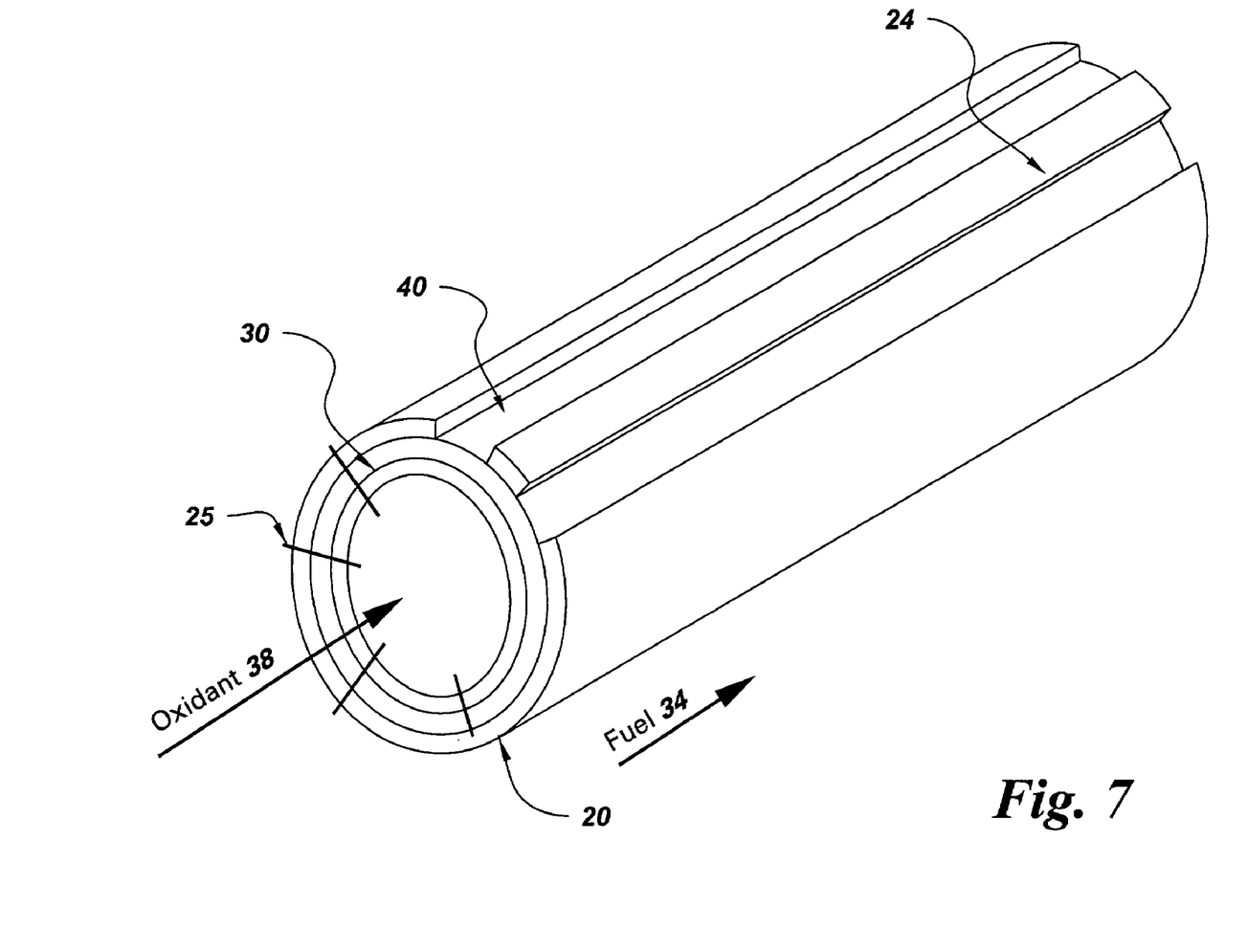
FIG. 7 is an exemplary exploded isometric view of a tubular fuel cell having a plurality of flow disruptors disposed thereon in accordance with another embodiment of the present invention.

While the present invention is discussed in terms of application to an embodiment illustrating planar configuration as in FIG. 1 through FIG. 6, it is recognized that such invention can be utilized in other embodiments of fuel cells including, but not limited to, tubular fuel cells. For example, FIG. 7 represents an exemplary arrangement of the flow disruptors 25 for a tubular fuel cell.

The invention has been illustrated with some exemplary embodiments as described above. However the invention is not necessarily intended to be limited to the embodiments described herein, since various modifications and substitutions can be made without departing in any way from the spirit of the present invention. As such, further modifications and equivalents of the invention herein disclosed can occur to persons skilled in the art using no more than routine experimentation, and all such modifications and equivalents are believed to be within the spirit and scope of the invention as defined by the appended claims.

What is claimed is:

1. A fuel cell assembly comprising:
   at least one fuel cell comprising an anode, a cathode, and an electrolyte interposed therebetween;
   at least one fluid flow channel disposed within said at least one fuel cell for delivering a fluid to said fuel cell; and
   at least one array of flow disruptors in contact with at least one of said anode, said cathode and said electrolyte, said flow disruptors protruding into said fluid flow channel so as to disrupt a flow of said fluid and enhance a heat transfer rate between said fluid and said fuel cell assembly when said fluid is introduced into said fluid flow channels;
   wherein said flow disruptors comprise a material which is the same as one of said anode, said cathode and said electrolyte.

2. The fuel cell assembly in accordance with claim 1, wherein said array of flow disruptors further comprises a second array of flow disruptors extending from said electrolyte into at least one of said cathode and said anode.

3. The fuel cell assembly in accordance with claim 1, wherein said fuel cell is typically selected from the group consisting of solid oxide fuel cells, proton exchange membrane fuel cells, molten carbonate fuel cells, phosphoric acid fuel cells, alkaline fuel cells, direct methanol fuel cells, regenerative fuel cells, zinc air fuel cells, and protonic ceramic fuel cells.

4. The fuel cell assembly in accordance with claim 1, wherein said fuel cell comprises at least one fuel cell having planar configuration.

5. The fuel cell assembly in accordance with claim 1, wherein said fuel cell comprises at least one fuel cell having tubular configuration.

6. The fuel cell assembly in accordance with claim 1, wherein said at least one fluid flow channel comprises an oxidant flow channel and a fuel flow channel and said array of flow disruptors protrude into at least one of said oxidant flow channel and said fuel flow channel.

7. The fuel cell assembly in accordance with claim 1, wherein said flow disruptors comprise a ceramic material.

8. The fuel cell assembly in accordance with claim 1, wherein said material of flow disruptors is selected from the group consisting of metallic nickel, silver, copper, cobalt, ruthenium, nickel-yttria-stabilized zirconia cermets (Ni-YSZ cermets), copper-yttria-stabilized zirconia cermets (Cu-YSZ cermets), Ni-Ceria cermets, perovskite doped lanthanum manganate ($LaMnO_3$), strontium-doped $LaMnO_4$ (SLM), tin doped Indium Oxide ($In_2O_3$), strontium-doped $PrMnO_3$, $LaFeO_3$—$LaCoO_3$ $RuO_2$-Yttria-stabilized zirconia (YSZ), lanthanum cobaltite, zirconium oxide, yttria stabilized zirconia (YSZ), doped ceria, cerium oxide ($CeO_2$), bismuth sesquioxide, pyrochlore oxides, doped zirconates, perovskite oxide materials, perfluorinated sulfonic acid polymers, polymer composites and combinations thereof.

9. The fuel cell assembly in accordance with claim 1, wherein said flow disruptors are typically selected from the group consisting of discrete pins, trip strips and baffle turbulators.

10. The fuel cell assembly in accordance with claim 1, wherein said flow disruptors have a substantially constant cross sectional area.

11. The fuel cell assembly in accordance with claim 1, wherein said flow disruptors have a cross-sectional shape selected from the group consisting of square, rectangular, circular, elliptical, annular and irregular shapes.

12. The fuel cell assembly in accordance with claim 1, wherein said flow disruptors have a width in the range between about 0.020 inches to about 0.25 inches.

13. The fuel cell assembly in accordance with claim 1, wherein said array of flow disruptors have an arrangement selected from the group consisting of in-line, staggered, uniformly spaced, and irregularly spaced arrangements.

14. The fuel cell assembly in accordance with claim 1, wherein said flow disruptors extend from said electrolyte through a surface of at least one of said anode and said cathode.

15. The fuel cell assembly comprising:
    at least one fuel cell comprising an anode, a cathode, and an electrolyte interposed therebetween;
    at least one fluid flow channel disposed within said at least one fuel cell for delivering a fluid to said fuel cell; and
    at least one array of flow disruptors extending from said electrolyte through at least one of said anode, said cathode and said electrolyte further including a second array of flow disruptors extending from said electrolyte into at least one of said cathode and said anode, said flow disruptors protruding into said fluid flow channel so as to disrupt a flow of said fluid and enhance a heat transfer rate between said fluid and said fuel cell assembly when said fluid is introduced into said fluid flow channel.

16. The fuel cell assembly in accordance with claim 15, wherein said flow disruptors are typically selected from the group consisting of discrete pins, trip strips and baffle turbulators.

17. The fuel cell assembly in accordance with claim 15, wherein said flow disruptors have a substantially constant cross sectional area.

18. The fuel cell assembly in accordance with claim 15, wherein said flow disruptors have a cross-sectional shape selected from the group consisting of square, rectangular, circular, elliptical, annular and irregular shapes.

19. The fuel cell assembly in accordance with claim 15, wherein said flow disruptors have a width in the range between about 0.020 inches to about 0.25 inches.

20. The fuel cell assembly in accordance with claim 15, wherein said army of flow disruptors have an arrangement selected from the group consisting of in-line, staggered, uniformly spaced, and irregularly spaced arrangements.

21. The fuel cell assembly in accordance with claim 15, wherein said flow disruptors comprise a material as one of said anode, said cathode and said electrolyte.

22. The fuel cell assembly in accordance with claim 21, wherein said material of flow disruptors is selected from the group consisting of metallic nickel, silver, copper, cobalt, ruthenium, nickel-yttria-stabilized zirconia cermets (Ni-YSZ cermets), copper-yttria-stabilized zirconia cermets (Cu-YSZ cermets), Ni-Ceria cermets, perovskite doped lanthanum manganate ($LaMnO_3$), strontium-doped $LaMnO_4$ (SLM), tin doped Indium Oxide ($In_2O_3$), strontium-doped $PrMnO_3$, $LaFeO_3$—$LaCoO_3$ $RuO_2$-Yttria-stabilized zirconia (YSZ), lanthanum cobaltite, zirconium oxide, yttria stabilized zirconia (YSZ), doped ceria, cerium oxide ($CeO_2$), bismuth sesquioxide, pyrochlore oxides, doped zirconates, perovskite oxide materials, perfluorinated sulfonic acid polymers, polymer composites and combinations thereof.

* * * * *

UNITED STATES PATENT AND TRADEMARK OFFICE
CERTIFICATE OF CORRECTION

| | |
|---|---|
| PATENT NO. | : 7,090,942 B2 |
| APPLICATION NO. | : 10/246066 |
| DATED | : August 15, 2006 |
| INVENTOR(S) | : Ronald Scott Bunker |

It is certified that error appears in the above-identified patent and that said Letters Patent is hereby corrected as shown below:

Column 8, line 2,
replace the word "army" with --array--.

Signed and Sealed this

Fifth Day of December, 2006

JON W. DUDAS
*Director of the United States Patent and Trademark Office*